Oct. 2, 1928.
J. S. THOMPSON
FRICTION BLOCK
Filed April 13, 1927
1,686,189
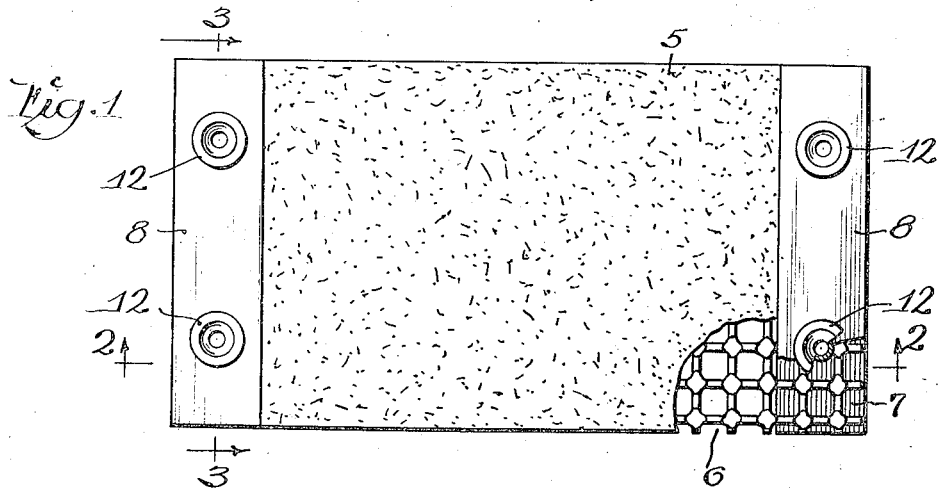
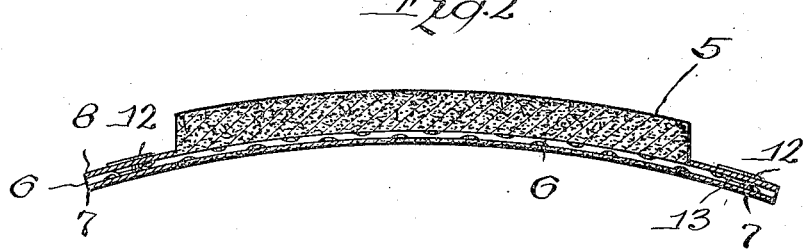
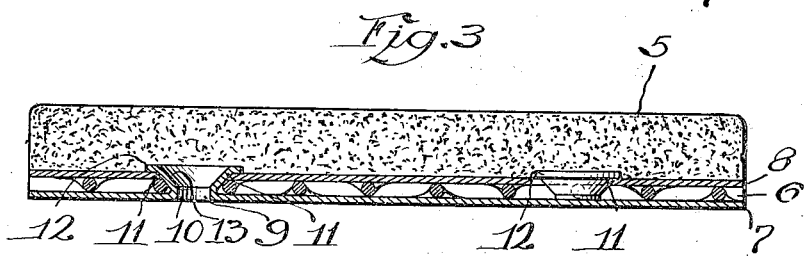
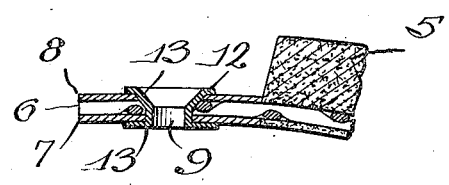
Inventor
James S. Thompson
By his Attorney Patented Oct. 2, 1928.

1,686,189

UNITED STATES PATENT OFFICE.

JAMES S. THOMPSON, OF NEW YORK, N. Y., ASSIGNOR TO AMERICAN BRAKE MATERIALS CORPORATION, OF NEW YORK, N. Y., A CORPORATION OF NEW YORK.

FRICTION BLOCK.

Application filed April 13, 1927. Serial No. 183,381.

This invention relates generally to friction brakes and more particularly to the provision of a novel brake or shoe for braking a moving member by frictional contact therewith. There are many different kinds of brake assemblies in which a block or shoe of this type may be employed, including internal expanding and external contracting brakes for automotive vehicles. The present invention is designed primarily for blocks adapted to be used in brake assemblies for relatively heavy vehicles such as busses and trucks, but it can be made in a size and shape adapted for lighter vehicles such as automobiles; and it may likewise be adapted for other uses for which brake blocks are or may be employed.

The object of the invention is to provide a novel and efficient friction block having a composition body carried by a reticulated metal back which is provided at its ends and beyond the ends of the body with means whereby the block may be easily and quickly secured in rigid position for use.

The invention has other objects in view which will appear hereafter in the detail description thereof in connection with the accompanying drawings in which I have shown the invention embodied in a friction block adapted to be mounted on the head of an internal expanding brake for automotive vehicles, as illustarting one embodiment of the invention. In these drawings, Fig. 1 is a plan view of the block, parts being broken away at one corner thereof.

Fig. 2 is a longitudinal sectional view of the block on the line 2—2 of Fig. 1.

Fig. 3 is an enlarged transverse sectional view on the line 3—3 of Fig. 1.

Fig. 4 is a detail enlarged sectional view illustrating a modification of the invention.

Referring to the drawings the block comprises a body 5 mounted upon and anchored to a reticulated metal back 6 which may be made of wire mesh, expanded metal, or other suitable reticulated material. The body is made of a suitable composition which will provide friction sufficient for the intended purpose and which is wear and heat resistant. I do not claim the composition in this application because the invention herein claimed is not restricted to the use of a particular composition, but is capable of use with a body formed of any composition suitable for the intended purpose. The back is embedded in the body and rigidly united therewith. This can be accomplished conveniently by inserting the back in a mold and molding the body material thereon under pressure sufficient to force the body material through the interstices of the back and into anchoring engagement with the strands of the back. The back forms a support and carrier for the composition body to which the body is securely anchored against displacement under all usual service conditions. The body may be made of any thickness desired to satisfy different requirements and, of course, it may be of any longitudinal and transverse dimensions desired.

The ends of the back project beyond the ends of the body to receive the devices whereby the block is fastened to its support and the invention provides a reinforcement for these extended ends to resist the strains to which the block is subjected in service. A transverse plate 7 is located under each extended end of the back and a transverse plate 8 is located over each extended end of the back and these two plates are clamped together upon the extended end to reinforce and strengthen the end of the back and provide a strong and substantial anchorage for the fastening devices which pass through openings 9 in the ends of the back and in the plates thereon. As a means for clamping the plates together upon the end of the back I may provide the lower plate 7 with integral tubular members 10 formed by stamping or drawing the metal of the plate, these tubular members passing upward through openings 11 in the upper plate and being riveted or flanged at 12 upon the upper plate. The tubular members constitute, in effect, eyelets whereby the end of the back is clamped tightly between the two plates. As shown in Fig. 4 I may provide separate eyelets 13 for securing the plates together upon the end of the back and for providing the openings 9 to receive the fastening devices. I prefer to shape the upper portion 13 of the eyelets, as shown in Fig. 3 and as shown in Fig. 4, to receive the head of the rivet or other fastening device by which the block is fastened to its support and so that the head will be seated in the eyelet below the normal limit of wear of the block so that the heads of the fastening devices will never contact with the member to be braked.

My invention provides simple but strong and substantial anchorage means on the reticulated back of the block for receiving the fastening devices by which the block is secured to its support. It is important that provision be made for securing the block rigidly in operative position, and it is also important that the fastening devices should be anchored to the back of the block in a permanent manner, which will not break down in service. In the commercial manufacture of the block it may not always be possible to arrange the fastening openings 9 to register with interstices of the back and sometimes it may be necessary in providing the openings in their proper position to sever one or more strands of the back. The clamping plates constitute a strong and substantial reinforcement for the ends of the reticulated back and overcome any weakness which may result from severing strands of the back. These clamping plates hold the strands in fixed position so that they will not skew under the strains of service and tend to loosen the block on its support or the anchorage of the back with the body. I prefer that the plates should extend entirely across and enclose the extended ends of the back, but under some conditions it may be sufficient to make the plates smaller than the extended ends of the back.

I have shown the invention in a form adapted to be used in an internal expanding brake for an automotive vehicle, but I do not restrict this invention to this particular use, but contemplate using it in other brake installations; and I reserve the right to make all such changes in the form, construction and arrangement of parts as fall within the scope of the following claims:

I claim:

1. A friction block comprising a composition body, a reticulated metal back anchored to the body and projecting beyond the ends thereof, and anchorage means on the extended ends of the back to receive the devices for fastening the block to a support.

2. A friction block comprising a composition body, a reticulated metal back anchored to the body and extended beyond the ends thereof, said ends having openings therethrough to receive the devices for fastening the block to a support, and means for reinforcing and strengthening the extended ends of the back about said fastening openings therein.

3. A friction block comprising a composition body, a back anchored to the body, parts of the back projecting beyond the body, and means on said projecting parts to reinforce and strengthen the parts.

4. A friction block comprising a composition body, a reticulated metal back anchored to the body and extended beyond the ends of the body, and a plate secured to each of said extended ends to reinforce and strengthen the ends.

5. A friction block comprising a composition body, a reticulated metal plate anchored to the body and extended beyond the ends thereof, transverse plates arranged on opposite sides of said extended ends, and means for clamping said plates upon said extended ends to reinforce and strengthen the ends.

6. A friction block comprising a composition body, a reticulated metal back anchored to the body and extended beyond the ends thereof, plates located on opposite sides of each of said extended ends, and means for clamping the plates upon the extended ends and forming openings to receive the devices for fastening the block to a support.

7. A friction block comprising a composition body, a reticulated metal back anchored to the body and extended beyond the ends of the body a plate on the back and a plate on the top of each of said extended ends, and an eyelet clamping said plates upon the extended end and forming an opening to receive a device for fastening the block to a support.

JAMES S. THOMPSON.